(12) United States Patent
Ohno et al.

(10) Patent No.: US 12,555,254 B2
(45) Date of Patent: Feb. 17, 2026

(54) MEDICAL IMAGE PROCESSING APPARATUS, MEDICAL IMAGE PROCESSING APPARATUS METHOD, AND NON-TRANSITORY, COMPUTER-READABLE MEDIUM

(71) Applicants: CANON MEDICAL SYSTEMS CORPORATION, Otawara (JP); FUJITA ACADEMY, Toyoake (JP)

(72) Inventors: Yoshiharu Ohno, Toyoake (JP); Kota Aoyagi, Nasushiobara (JP); Hitoshi Yamagata, Otawara (JP)

(73) Assignees: CANON MEDICAL SYSTEMS CORPORATION, Otawara (JP); FUJITA ACADEMY, Toyoake (JP)

( * ) Notice: Subject to any disclaimer, the term of this patent is extended or adjusted under 35 U.S.C. 154(b) by 404 days.

(21) Appl. No.: 18/176,513

(22) Filed: Mar. 1, 2023

(65) Prior Publication Data
US 2023/0281838 A1  Sep. 7, 2023

(30) Foreign Application Priority Data
Mar. 3, 2022  (JP) .................................. 2022-032622

(51) Int. Cl.
*G06T 7/33* (2017.01)
*G06T 7/00* (2017.01)
*G06T 7/155* (2017.01)

(52) U.S. Cl.
CPC ............ *G06T 7/337* (2017.01); *G06T 7/0014* (2013.01); *G06T 7/155* (2017.01); *G06T 2207/20036* (2013.01); *G06T 2207/30061* (2013.01)

(58) Field of Classification Search
CPC .................. G06T 7/0014; G06T 7/155; G06T 2207/20036; G06T 2207/10081; G06T 2207/10088; G06T 2207/10104
See application file for complete search history.

(56) References Cited

U.S. PATENT DOCUMENTS

| | | | |
|---|---|---|---|
| 2016/0203621 A1* | 7/2016 | Seki ...................... | G06T 11/008 382/131 |
| 2018/0071027 A1* | 3/2018 | Taylor .................... | A61B 5/745 |
| 2020/0111208 A1* | 4/2020 | Yoshida ................. | A61B 5/055 |

FOREIGN PATENT DOCUMENTS

| | | | | |
|---|---|---|---|---|
| JP | 2015-136480 A | | 7/2015 | |
| JP | 2016129662 A | * | 7/2016 | |
| WO | WO-2014115151 A1 | * | 7/2014 | ............. A61B 6/506 |

* cited by examiner

*Primary Examiner* — Andrew M Moyer
*Assistant Examiner* — Conor A O'Malley
(74) *Attorney, Agent, or Firm* — Oblon, McClelland, Maier & Neustadt, L.L.P.

(57) ABSTRACT

A medical image processing apparatus includes processing circuitry. The processing circuitry obtains a morphological image and a functional image including at least a predetermined anatomical structure of a test subject; obtains reference morphological data and reference functional data corresponding to the morphological image and the functional image, respectively; individually segments the morphological image and the reference morphological data according to a function of interest appearing on the functional image; segments the functional image with reference to the segmental morphological images, and segments the reference functional data with reference to the segmental reference morphological data; performs a first registration process for aligning the segmental morphological images and the segmental reference morphological data with each other; and performs a second registration process for aligning the (Continued)

segmental functional images and the segmental reference functional data with each other according to a result of the first registration process.

14 Claims, 3 Drawing Sheets

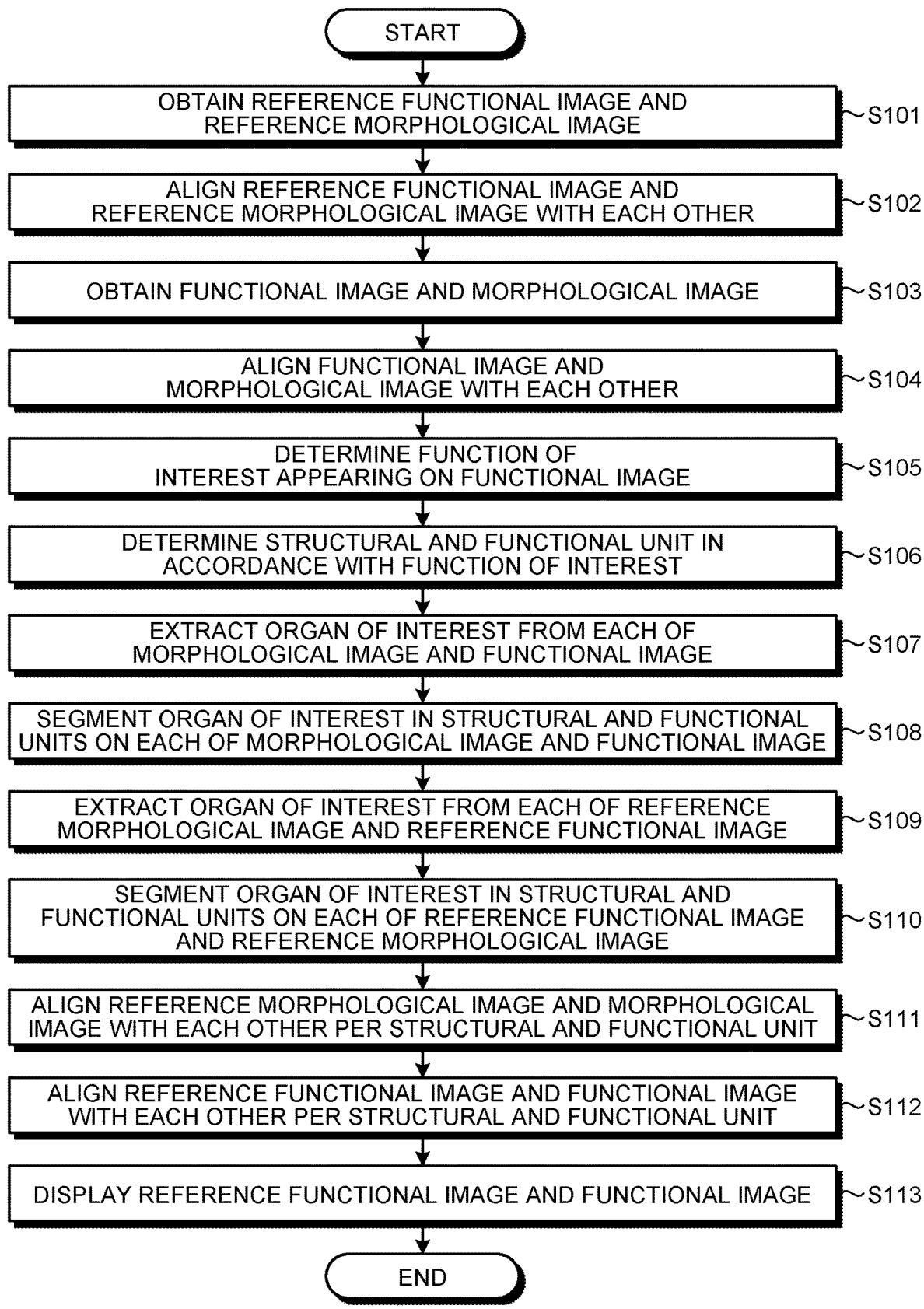

MEDICAL IMAGE PROCESSING APPARATUS, MEDICAL IMAGE PROCESSING APPARATUS METHOD, AND NON-TRANSITORY, COMPUTER-READABLE MEDIUM

CROSS-REFERENCE TO RELATED APPLICATION

This application is based upon and claims the benefit of priority from Japanese Patent Application No. 2022-032622, filed on Mar. 3, 2022; the entire contents of which are incorporated herein by reference.

FIELD

Embodiments described herein relate generally to a medical image processing apparatus, a medical image processing method, and a non-transitory, computer-readable medium.

BACKGROUND

Traditionally, functional diagnostic methods are known, which image the functions of a human body for use in diagnosis by capturing a subject as a human body to obtain functional images, for example. A large number of functional diagnostic methods are available for different purposes, including, for example, positron emission tomography (PET), magnetic resonance imaging (MRI), fluorescence imaging, magnetic nano-particle imaging, and pH imaging.

In this regard, functional diagnosis intended for diagnosing a disease requires monitoring of obtained signal values as to whether or not the signal values are within the normal range or the signal values are on the decrease, impaired, or on the increase due to the disease. In the functional diagnosis, it is thus important to compare between functional images of a healthy person and a patient or between functional images of the same patient captured at different points in time.

To compare the functional images, the functional images may be aligned with each other with reference to, for example, the outer shape of a human body or an organ with distinctive boundaries and features. However, such positional adjustment between the functional images based on the outer shape of a human body or an organ may result in low alignment accuracy in terms of anatomical structure level inside the organ. Because of this, it may not be possible to properly compare the functional images when the function to be observed is localized in the organ or the degree of function differs depending on sites. This may cause degradation in diagnostic accuracy based on the functional images.

BRIEF DESCRIPTION OF THE DRAWINGS

FIG. 3 is a flowchart illustrating an example of medical image processing according to an embodiment.

DETAILED DESCRIPTION

Figure 1:
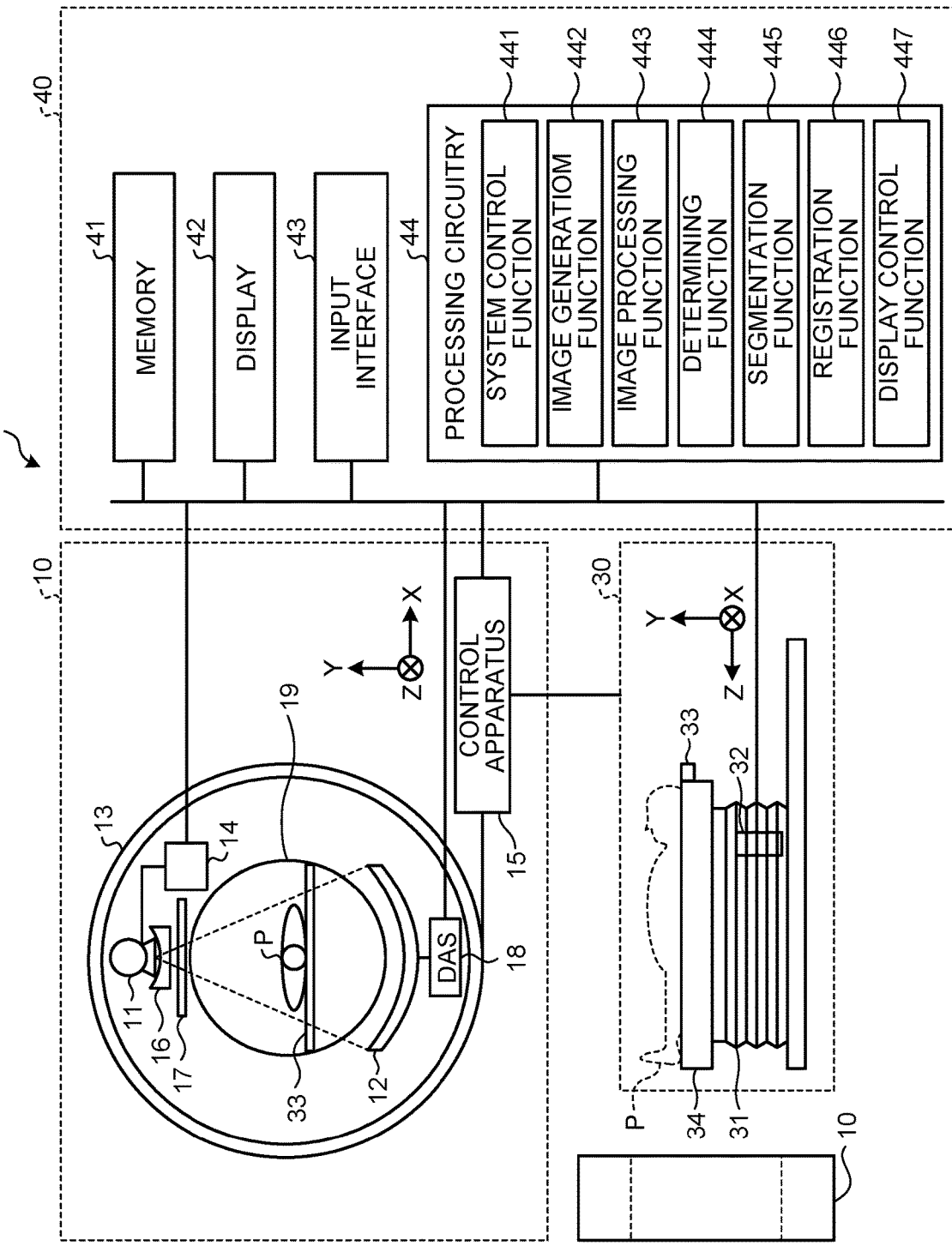
FIG. 1 illustrates an exemplary structure of an X-ray computed tomography (CT) apparatus incorporating a medical image processing apparatus according to an embodiment.

According to one embodiment, a medical image processing apparatus includes processing circuitry. The processing circuitry is configured to obtain a morphological image including at least a predetermined anatomical structure of a test subject and a functional image corresponding to the morphological image; obtain reference morphological data corresponding to the morphological image and reference functional data corresponding to the functional image; obtain segmental morphological images and segmental reference morphological data by individually segmenting the morphological image and the reference morphological data according to a function of interest appearing on the functional image; obtain segmental functional images by segmenting the functional image with reference to the segmental morphological images, and obtain segmental reference functional data by segmenting the reference functional data with reference to the segmental reference morphological data; perform a first registration process for aligning the segmental morphological images and the segmental reference morphological data with each other; and perform a second registration process for aligning the segmental functional images and the segmental reference functional data with each other according to a result of the first registration process.

Hereinafter, various embodiments of a medical image processing apparatus, a medical imaging processing method, and a non-transitory, computer-readable medium will be described with reference to the accompanying drawings. Throughout this disclosure, components or elements including the same or substantially the same functions may be denoted by the same reference numerals and an overlapping explanation thereof will be omitted unless necessary. Further, the same part or portion of an element may be represented in different dimensions or ratios in the drawings. In view of better visibility of the drawings, for example, only major or representative elements may be denoted by reference numerals and other elements having the same or substantially the same functions may be added with no reference numerals.

In the respective embodiments to be described below, a medical image processing apparatus according to an embodiment is incorporated in an X-ray computed tomography (CT) apparatus, by way of example.

In addition to being incorporated in an X-ray CT apparatus, the medical image processing apparatus according to an embodiment may be implemented as an independent apparatus as a computer with hardware resources including a processor and memory such as a ROM and a RAM. In this case, the processor included in the computer can implement various kinds of functions of an embodiment by reading and loading programs from the ROM onto the RAM to execute the programs.

The medical image processing apparatus according to an embodiment may be incorporated in any of other medical image diagnosis apparatuses than the X-ray CT apparatus. In this case, the processor included in the medical image diagnosis apparatus can implement various kinds of functions of an embodiment by reading and loading programs from the ROM onto the RAM to execute the programs. Examples of other types of medical image diagnosis apparatus include an X-ray diagnosis apparatus, a magnetic resonance imaging (MRI) apparatus, an ultrasonic diagnosis apparatus, a single photon emission computed tomography (SPECT) apparatus, a positron emission computed tomography (PET) apparatus, a SPECT-CT apparatus as an integration of a SPECT apparatus and an X-ray CT apparatus, and a PET-CT apparatus as an integration of a PET apparatus and an X-ray CT apparatus.

For example, various types of X-ray CT apparatuses such as a third generation CT and a fourth generation CT are available. Any type of X-ray CT apparatus is applicable to the respective embodiments. The third generation CT refers to a rotate/rotate-type that an X-ray tube and a detector rotate about the subject in an integrated manner. The fourth generation CT refers to a stationary/rotate-type including a large number of X-ray detector elements stationarily arrayed in a ring form that only the X-ray tube rotates about the subject.

FIG. 1 illustrates an exemplary structure of an X-ray CT apparatus 1 incorporating a medical image processing apparatus according to an embodiment. The X-ray CT apparatus 1 emits X-rays to a subject P from an X-ray tube 11 and detects the X-rays with an X-ray detector 12. The X-ray CT apparatus 1 generates a CT image of the subject P in accordance with an output from the X-ray detector 12. The subject P is an example of a test subject and a healthy subject to be compared with the test subject as to a functional state whose function is to be captured in a functional image by, for example, a PET apparatus.

As illustrated in FIG. 1, the X-ray CT apparatus 1 includes a gantry 10, a couch 30, and a console 40. For the sake of convenience, FIG. 1 depicts multiple gantries 10. The gantry 10 is a scan apparatus structured to CT scan the subject P with X-rays. The couch 30 is a carrier on which the subject P to be CT scanned with X-rays is laid for localizer scanning. The console 40 is a computer that performs control over the gantry 10. For example, the gantry 10 and the couch 30 are installed in a CT examination room while the console 40 is installed in a control room adjacent to the CT examination room. The gantry 10, the couch 30, and the console 40 are communicably connected to one another in a wired or wireless manner.

The console 40 may not be installed in the control room. For example, the console 40 may be installed together with the gantry 10 and the couch 30 in the same room. Alternatively, the console 40 may be incorporated in the gantry 10.

In the present embodiment, the rotational axis of a rotational frame 13 in a non-tilted state or the longitudinal direction of a table top 33 of the couch 30 is defined as a Z-axis direction. An axial direction orthogonal to the Z-axis direction and horizontal to the floor is defined as an X-axis direction. An axial direction orthogonal to the Z-axis direction and vertical to the floor is defined as a Y-axis direction.

As illustrated in FIG. 1, the gantry 10 includes the X-ray tube 11, the X-ray detector 12, the rotational frame 13, an X-ray high voltage apparatus 14, a control apparatus 15, a wedge 16, a collimator 17, and a data acquisition system (DAS) 18.

The X-ray tube 11 is a vacuum tube having a negative pole (filament) that generates thermoelectrons and a positive pole (target) that generates X-rays by colliding with thermoelectrons. The X-ray tube 11 is supplied with a high-voltage from the X-ray high-voltage apparatus 14 to irradiate the subject P with X-rays by emitting thermoelectrons from the negative pole to the positive pole.

Hardware that produces X-rays is not limited to the X-ray tube 11. For example, a fifth-generation CT system may be used for X-ray generation, in place of the X-ray tube 11. The fifth-generation CT system includes a focus coil that converges electronic beams issued from an electronic gun, a deflection coil for electro-magnetic deflection of the electronic beams, and a target ring surrounding a half circumference of the subject P to generate X-rays by collision among the deflected electronic beams.

The X-ray detector 12 detects an X-ray emitted from the X-ray tube 11 and having passed through the subject P and outputs an electric signal corresponding to an amount of the X-ray to the DAS 18. The X-ray detector 12 includes, for example, multiple arrays of detection elements arranged along a single arc about the focal point of the X-ray tube 11 in a channel direction. The X-ray detector 12 has a structure that arrays of detection elements in the channel direction are arrayed in a slice direction (column or row direction), for example. The X-ray detector 12 is exemplified by an indirect-conversion detector including a grid, a scintillator array, and an optical sensor array. The scintillator array includes multiple scintillators and each scintillator includes a scintillator crystal that outputs an amount of light corresponding to an amount of incident X-rays. The grid is disposed on the X-ray incident side of the scintillator array and includes an X-ray shield plate that functions to absorb scattered X-rays. The grid may be referred to as a collimator (one-dimensional collimator or two-dimensional collimator). The optical sensor array functions to convert an amount of light from the scintillators into an electric signal. The optical sensors may be, for example, photo multipliers (PMT). The X-ray detector 12 may be a direct-conversion detector including a semiconductor element that converts an incident X-ray into an electric signal.

The rotational frame 13 is an annular frame that supports the X-ray tube 11 and the X-ray detector 12 in opposing positions to rotate the X-ray tube 11 and the X-ray detector 12 under the control of the control apparatus 15 as later described. The rotational frame 13 is provided with an opening 19 with an image field of view (FOV) set. The rotational frame 13 is, for example, a casting made of aluminum. The rotational frame 13 can further support the X-ray high voltage apparatus 14, the wedge 16, the collimator 17, and the DAS 18 in addition to the X-ray tube 11 and the X-ray detector 12. The rotational frame 13 can further support other various elements (not illustrated in FIG. 1).

The X-ray high voltage apparatus 14 includes a high voltage generator and an X-ray control device. The high voltage generator includes electric circuitry such as a transformer and a rectifier and functions to generate a high voltage to be applied to the X-ray tube 11 and a filament current to be supplied to the X-ray tube 11. The X-ray control device controls the output voltage in accordance with the X-rays emitted from the X-ray tube 11. The high-voltage generator may be of a transformer type or of an inverter type. Further, the X-ray high-voltage apparatus 14 may be disposed in the rotational frame 13 or in the stationary frame (not illustrated) of the gantry 10. The stationary frame works to rotatably support the rotational frame 13.

The control apparatus 15 includes a driving mechanism such as a motor and an actuator, and processing circuitry including memory and a processor to control the driving mechanism. In accordance with an input signal from an input interface 43 or an input interface included in the gantry 10, the control apparatus 15 controls the operation of the gantry 10 and the couch 30. For example, the control apparatus 15 controls the rotation of the rotational frame 13, the tilting of the gantry 10, and the operation of the couch 30. The control apparatus 15 controls the gantry 10 to tilt by rotating the rotational frame 13 about an axis parallel to the X-axis direction according to tilt-angle information received from an input interface attached to the gantry 10. The control apparatus 15 may be included in the gantry 10 or in the console 40.

The wedge 16 is a filter for adjusting the number of X-rays emitted from the X-ray tube 11. Specifically, the wedge 16 serves to allow the X-rays emitted from the X-ray tube 11 to transmit therethrough for attenuation, so that the subject P is irradiated with the X-rays from the X-ray tube 11 in a predefined distribution. The wedge 16 is formed of aluminum and has a predetermined target angle and a predetermined thickness. Examples of the wedge 16 include a wedge filter and a bow-tie filter.

The collimator 17 functions to limit the irradiation range of the X-rays having transmitted the wedge 16. The collimator 17 slidably supports lead plates forming slits and adjusts the form of the slits to shield the X-rays. The collimator 17 may be referred to as an X-ray diaphragm.

The DAS 18 functions to read electric signals from the X-ray detector 12. The electric signals correspond to the doses of X-rays detected by the X-ray detector 12. The DAS 18 amplifies the electric signals and integrates or adds them in a view period to acquire detection data having a digital value corresponding to the dose of X-rays during the view period. The detection data may be referred to as projection data. The DAS 18 can be implemented by, for example, an application specific integrated circuit (ASIC) incorporating a circuit element that can generate projection data. The DAS 18 transfers the projection data to the console 40 via a non-contact data transfer device, for example.

The detection data generated by the DAS 18 is transmitted by optical communication from a transmitter with light emitting diodes (LED) included in the rotational frame 13 to a receiver with photodiodes included in the non-rotational part (e.g., stationary frame, not illustrated in FIG. 1) of the gantry 10, and then transferred to the console 40. Examples of adoptable detection-data transmission method from the rotational frame 13 to the non-rotational part of the gantry 10 include any non-contact data transfer method in addition to the optical communication.

In the present embodiment the X-ray CT apparatus 1 incorporates an integrating X-ray detector 12 by way of example. However, the techniques based on the present embodiment can be implemented as an X-ray CT apparatus 1 incorporating a photon-counting X-ray detector.

The couch 30 is a device on which the subject P to be scanned is to be laid and moved, and includes a base 31, a couch driver 32, the table top 33, and a support frame 34. The base 31 is a housing that supports the support frame 34 movably in a vertical direction. The couch driver 32 is a drive mechanism that moves the table top 33 in the longitudinal direction thereof, and includes a motor and an actuator. The table top 33 is a plate on which the subject P is to be laid. The table top 33 is placed on the top surface of the support frame 34. The table top 33 can protrude from the couch 30 toward the gantry 10 so as to allow the entire body of the subject P to be scanned. The table top 33 is formed of, for example, carbon fiber reinforced plastic (CFRP) with good X-ray transmissivity and physical property such as rigidity and strength. For example, the table top 33 is hollow inside. The support frame 34 supports the table top 33 movably in the longitudinal direction. The couch driver 32 may also move the support frame 34 in the longitudinal direction of the table top 33, in addition to the table top 33.

The console 40 includes a memory 41, a display 42, the input interface 43, and processing circuitry 44. The memory 41, the display 42, the input interface 43, and the processing circuitry 44 perform data communications with one another via, for example, a bus. Although the console 40 and the gantry 10 are separately provided herein, the gantry 10 may include the console 40 or part of the elements of the console 40.

The memory 41 can be implemented by, for example, a semiconductor memory device as a random access memory (RAM) or a flash memory, a hard disk, or an optical disk. The memory 41 stores therein, for example, projection data and reconstructed image data. The memory 41 further stores various programs, for example. The memory 41 further stores, for example, a table containing functions to be diagnosed, anatomical structures such as organs that perform the functions, and units of segmentation of morphological images and reference morphological images in association with one another. The storage regions of the memory 41 may be provided in the X-ray CT apparatus 1 or in an external storage device connected via a network. The memory 41 is an exemplary storage.

The display 42 displays various kinds of information. For example, the display 42 displays medical images (CT images) generated by the processing circuitry 44 and a graphical user interface (GUI) that allows the operator to perform various kinds of operation. The information to be displayed on the display 42 includes a display screen for displaying reference functional images and functional images in a comparable manner with reference to anatomical structures. The display 42 can be any of various kinds of displays when appropriate. Examples of the display 42 include a liquid crystal display (LCD), a cathode ray tube (CRT) display, an organic electroluminescence display (OELD), and a plasma display.

The display 42 may be installed in any location in the control room. The display 42 may be included in the gantry 10. The display 42 may be a desktop type or may include a tablet terminal wirelessly communicable with the console device 40 itself. The display 42 can be one or two or more projectors. The display 42 is an exemplary display.

The input interface 43 serves to receive various kinds of inputs from the operator to convert the inputs into electrical signals and output the electrical signals to the processing circuitry 44. As an example, the input interface 43 receives, from the operator, an acquisition condition for acquiring projection data, a reconstruction condition for reconstructing CT images, an image processing condition for generating post-processed images from CT images, and else.

Examples of the input interface 43 include a mouse, a keyboard, a trackball, a switch, a button, a joystick, a touch-pad, and a touch panel display, as appropriate. In the present embodiment the input interface 43 is not limited to the one including these physical operational components. Other examples of the input interface 43 include electrical-signal processing circuitry that receives an electrical signal corresponding to an input from an external input device separated from the apparatus to output the electrical signal to the processing circuitry 44. Alternatively, the input interface 43 may be included in the gantry 10. The input interface 43 may include a tablet terminal wirelessly communicable with the console 40 itself. The input interface 43 is an exemplary input unit.

The processing circuitry 44 controls the operation of the X-ray CT apparatus 1 as a whole. The processing circuitry 44 includes, for example, hardware resources including a processor and memory such as a ROM and a RAM. The processing circuitry 44 uses the processor that loads and executes programs onto the memory, to implement a system control function 441, an image generation function 442, an image processing function 443, a determining function 444, a segmentation function 445, a registration function 446, and a display control function 447. The processing circuitry 44 is an exemplary processing unit. The programs for executing the system control function 441, the image generation function 442, the image processing function 443, the determining function 444, the segmentation function 445, the registration function 446, and the display control function 447 are stored in the memory 41. The memory 41 is an example of a non-transitory, computer-readable storage medium containing instructions for the computer to execute.

The processing circuitry 44 uses the system control function 45 to control the respective functions of the processing circuitry 44 in response to receipt of inputs from the operator via the input interface 43. The processing circuitry 44 controls, for example, the gantry 10 to perform a CT scan. The processing circuitry 44 uses the image generation function 442 and the image processing function 443 to obtain volume data of the subject P from detection data resulting from the CT scan, as described later. Further, the processing circuitry 44 obtains a functional image and a reference functional image of the subject P from the memory 41 or an outside of the X-ray CT apparatus 1. The processing circuitry 44 implementing the system control function 441 is an example of a first obtainer unit and a second obtainer unit.

In the present embodiment, the X-ray CT apparatus 1 obtains volume data including at least the lungs of each of a test subject (subject P) for functional diagnosis and a healthy subject (subject P) to be compared with the test subject with respect to a functional state, by way of example. The volume data of the test subject and CT image data based on the volume data are an example of morphological images. The volume data of the healthy subject and CT image data based on the volume data correspond to reference morphological images and are an example of reference morphological data. The lungs are an example of a predetermined organ and a predetermined anatomical structure.

In the present embodiment, a PET apparatus provided outside the X-ray CT apparatus 1 obtains PET image data including at least the lungs of each of a test subject and a healthy subject to perform a functional diagnosis of at least one of ventilation, blood flow, diffusion, and respiratory movement of the lungs of the test subject, by way of example. The PET image data including at least the lungs of the test subject is an exemplary functional image corresponding to the morphological image of the test subject. The PET image data including at least the lungs of the healthy subject is a reference functional image corresponding to the reference morphological image of the healthy subject and is exemplary reference functional data. At least one of the pulmonary functions among ventilation, blood flow, diffusion, and respiratory movement is an exemplary function of the test subject to be captured in a functional image. When the functional image represents gas exchange, i.e., interactions among ventilation, blood flow, and diffusion related to gas exchange, the pulmonary gas exchange function can be an exemplary function of the test subject to be captured in a functional image.

The present embodiment describes, but is not limited to, an example of obtaining functional images and reference functional images from the PET apparatus outside the X-ray CT apparatus. For example, a PET-CT apparatus may be provided to obtain the morphological images and functional images of the test subject as well as the reference morphological images and reference functional images of the healthy subject. In such a case the morphological image and the functional image or the reference morphological image and the reference functional image are aligned with each other to be able to depict the subject P in the same position, which can contribute to improvement in diagnostic accuracy based on the functional images.

In addition, the volume data of at least one of the test subject and the healthy subject may be obtained from outside of the X-ray CT apparatus 1.

The processing circuitry 44 uses the image generation function 442 to subject the detection data output from the DAS 18 to pre-processing including logarithm conversion, offset correction, sensitivity correction among the channels, and beam hardening correction, to generate data. The processing circuitry 44 stores the resultant data in the memory 41. Data before pre-processed (i.e., detection data) and pre-processed data may be collectively referred to as projection data. The processing circuitry 44 perform reconstruction processing to generated projection data (pre-processed data) by filtered back projection (FBP), iterative reconstruction, or machine learning to generate CT image data. The processing circuitry 44 stores the CT image data in the memory 41.

The processing circuitry 44 uses the image processing function 443 to convert the CT image data generated by the image generation function 442 into planar image data or three-dimensional image data of any cross section by a known method, in accordance with an operator's input received via the input interface 43. For example, the processing circuitry 44 subjects the CT image data to three-dimensional image processing including volume rendering, surface rendering, intensity projection, multi-planar reconstruction (MPR), and/or curved MPR (CPR) to generate rendering image data in some viewing direction. The image generation function 46 may directly generate three-dimensional image data such as the rendering image data in some viewing direction, i.e., volume data. The processing circuitry 44 stores the planar image data and the three-dimensional image data in the memory 41.

The processing circuitry 44 uses the determining function 444 to determine a function to be captured in a functional image, i.e., a function of the test subject to be diagnosed. The processing circuitry 44 determines a function as a subject of functional diagnosis, in response to an operator's input received via the input interface 43, for example. Alternatively, the processing circuitry 44 may determine a function as a subject of functional diagnosis based on supplementary information attached to at least one of the morphological image and the functional image of the test subject. The processing circuitry 44 may determine a function as a subject of functional diagnosis based on examination information for obtaining at least one of the morphological image and the functional image of the test subject. The processing circuitry 44 implementing the determining function 444 is an exemplary determiner unit.

The processing circuitry 44 uses the segmentation function 445 to individually segment the morphological image of the test subject and the reference morphological image of the healthy subject depending on the function to be diagnosed, to obtain segmental morphological images of the test subject and segmental reference morphological images of the healthy subject. As an example, the processing circuitry 44 individually segments the morphological image and the reference morphological image with reference to a site of an organ of interest, the site that performs a function to be diagnosed. The organ of interest is an exemplary anatomical structure to be diagnosed, as described above. As an example, the processing circuitry 44 segments the morphological image and the reference morphological image per structural and functional unit or group of structural and functional units based on the anatomical structure having the function of the organ of interest. Further, the processing circuitry 44 obtains segmental functional images of the test subject by segmenting the functional image of the test subject with reference to the segmental morphological images of the test subject. Similarly, the processing circuitry 44 obtains segmental reference functional images of the healthy subject by segmenting the reference functional image of the healthy subject with reference to the segmental reference morphological images of the healthy subject. The processing circuitry 44 implementing the segmentation function 445 is an example of a first segmentation unit and a second segmentation unit.

The processing circuitry 44 uses the registration function 446 to perform a first registration process to align the segmental morphological images of the test subject and the segmental reference morphological images of the healthy subject with each other. The processing circuitry 44 further performs a second registration process to align the segmental functional images of the test subject and the segmental reference functional images of the healthy subject with each other according to a result of the first registration process to the segmental morphological images of the test subject and the segmental reference morphological images of the healthy subject. The processing circuitry 44 implementing the registration function 446 is an example of a first registration unit and a second registration unit.

The processing circuitry 44 uses the display control function 447 to display images on the display 42 based on various kinds of image data generated by the image processing function 443. The images for display on the display 42 include images showing the segmental functional images of the test subject and the segmental reference functional images of the healthy subject in a comparable manner. The images for display on the display 42 further include CT images based on CT image data, planar images based on planar image data of some cross section, and rendering images based on rendering image data in some viewing direction. The images for display on the display 42 further include images showing operation screens and images showing notices and warning to the operator.

Any of the image generation function 442, the image processing function 443, the segmentation function 445, the registration function 446, and the display control function 447 can generate the image data that allows the display of the segmental functional images of the test subject and the segmental reference functional images of the healthy subject in a comparable manner.

The respective functions 441 to 447 are herein implemented by the single piece of processing circuitry as an example, however, it is not to be construed as limiting. The processing circuitry 44 may be constituted of a combination of multiple independent processors so that the individual processors execute the programs to implement the respective functions 441 to 447. Alternatively, the respective functions 441 to 447 may be implemented by one or two or more processing circuits in a distributed or integrated manner, when appropriate.

The console 40 is illustrated herein as a single console that implements multiple functions, by way of example. However, multiple consoles may be provided to independently implement multiple functions. For example, independent consoles may include the functions of the processing circuitry 44 such as the image generation function 442, the image processing function 443, the determining function 444, the segmentation function 445, and the registration function 446 in a distributed manner.

The processing circuitry 44 may be partially or entirely included in the console 40. In addition, the processing circuitry 44 may be included in an integrated server that collectively processes the detection data acquired by multiple medical image diagnostic apparatuses.

At least one of the post-processing, the determination process, and the segmentation process, the registration process, and the display process may be executed by either the console 40 or an external workstation or by both of the console 40 and an external workstation concurrently. Examples of the workstation may include a computer including hardware resources such as a processor that implements the functions corresponding to the respective processes and memory as a ROM and a RAM.

The X-ray CT image data may be reconstructed by either of a full-scan reconstruction and a half-scan reconstruction. For example, the image generation function 442 of the processing circuitry 44 uses 360-degree projection data of the subject P, i.e., the entire circumference of the subject P in the full-scan reconstruction. The processing circuitry 44 uses projection data of 180 degrees plus a fan angle in the half-scan reconstruction. In the following the processing circuitry 44 adopts the full-scan reconstruction that reconstructs an image from 360-degree projection data, i.e., the entire circumference of the subject P, for simplicity.

The techniques based on the present embodiment are applicable to both a single-source X-ray computed tomography apparatus and a multiple-source X-ray computed tomography apparatus incorporating two or more pairs of X-ray tubes and detectors on the rotational ring.

Further, the techniques based on the present embodiment are applicable to a dual-energy X-ray CT apparatus 1. In this case, the X-ray high-voltage apparatus 14 can alternatively switch X-ray energy spectra emitted from the X-ray tube 11 by switching two voltage values at high speed, for example. In other words, the X-ray CT apparatus 1 is configured to be able to acquire projection data in each acquisition view while modulating the tube voltage at the timing conforming to a tube-voltage modulation control signal. By scanning the subject P at different tube voltages, thus, the X-ray CT apparatus 1 can enhance the contrast density of CT images in accordance with the energy transmissivity of substance per X-ray energy spectrum.

The X-ray CT apparatus 1 according to the present embodiment may be configured to sequentially read electric signals from the X-ray detector 12.

The X-ray CT apparatus 1 according to the present embodiment can be structured as an upright CT. In such a case the X-ray CT apparatus 1 may include a patient support mechanism that is movable along the rotational axis of the rotational part of the gantry 10 while supporting the subject P in an upright state, in place of the table top 33. Alternatively, the X-ray CT apparatus 1 according to the present embodiment can be structured as a mobile CT in which the gantry 10 and the couch 30 are movable.

Figure 2:
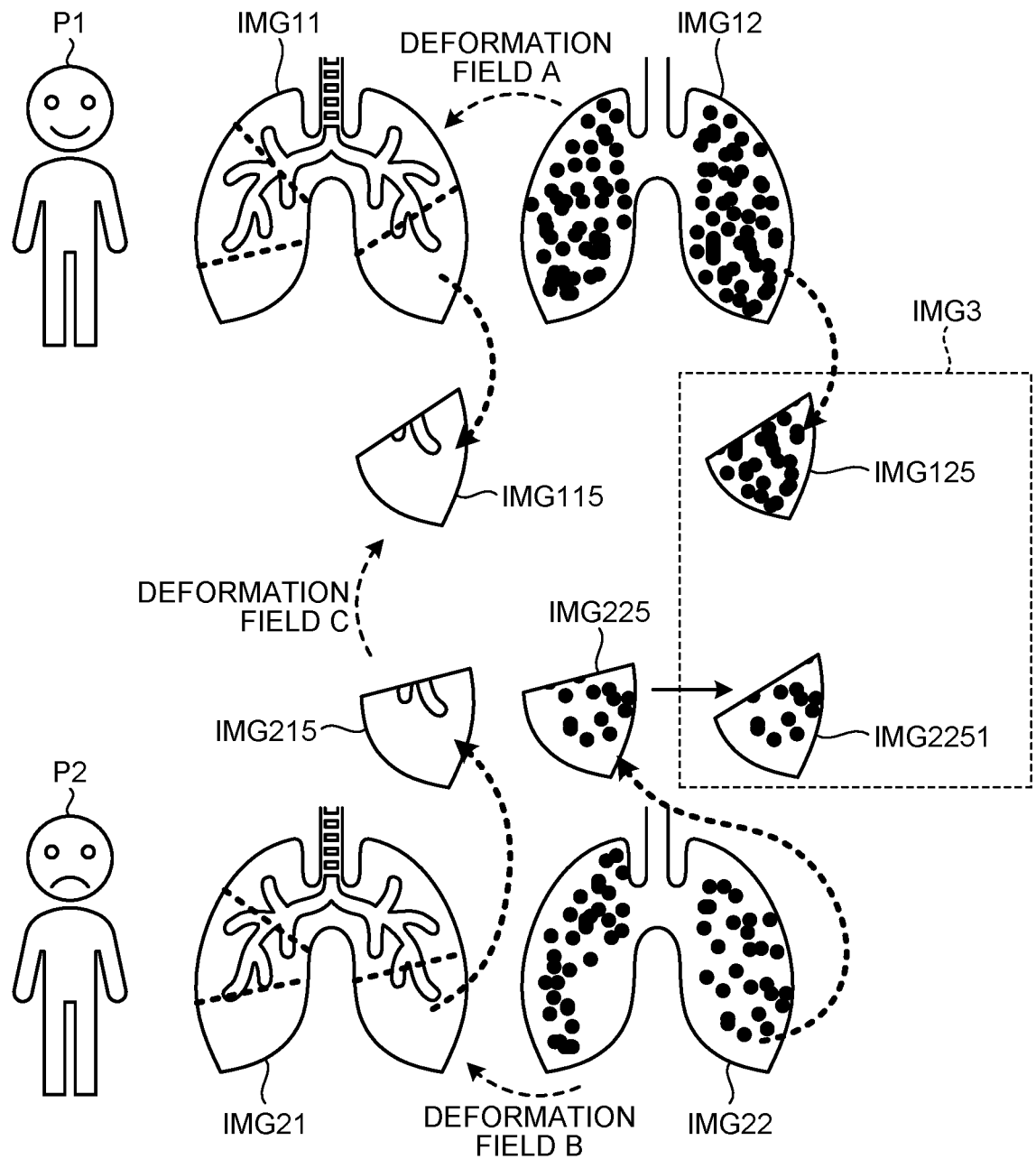
FIG. 2 is a diagram for illustrating an outline of medical image processing according to an embodiment.

FIG. 2 is a diagram for illustrating an outline of medical image processing according to an embodiment. FIG. 3 is a flowchart illustrating exemplary medical image processing according to an embodiment. In FIGS. 2 and 3 the reference morphological image of a healthy subject P1 is exemplified by a reference morphological image IMG11. In FIGS. 2 and 3 the reference functional image of the healthy subject P1 is exemplified by a reference functional image IMG12.

First, the processing circuitry 44 processes the image of the healthy subject P1 to be compared with a test subject P2 (S101 to S102).

Specifically, the processing circuitry 44 obtains a pair of the reference functional image IMG12 being the functional image of the healthy subject P1 and the reference morphological image IMG11 being the morphological image corresponding to the reference functional image IMG12 (S101).

The processing circuitry 44 then aligns the reference functional image IMG12 and the reference morphological image IMG11 with each other for registration (S102). Any of various known methods is suitably adoptable for the alignment. By this alignment, a deformation field A where the reference functional image IMG12 becomes aligned with the reference morphological image IMG11 is generated.

Likewise, the processing circuitry 44 processes the image of the test subject P2 as a subject of functional diagnosis (S103 to S108).

Specifically, the processing circuitry 44 obtains a pair of a functional image IMG22 of the test subject P2 and a morphological image IMG21 corresponding to the functional image IMG22 (S103).

The processing circuitry 44 aligns the functional image IMG22 and the morphological image IMG21 with each other for registration (S104). Any of various known methods is suitably adoptable for the alignment. By this alignment, a deformation field B where the functional image IMG22 becomes aligned with the morphological image IMG21 is generated.

The processing circuitry 44 determines a function of interest on the functional image IMG22 (S105) to determine a structural and functional unit as a unit of segmentation in accordance with the function of interest (S106).

For example, the lungs are segmented into left and right lungs. After the segmentation, the left lung is further segmented into two lobes while the right lung is segmented into three lobes. The individual lobes are further segmented into smaller regions called pulmonary segments. Each of the pulmonary segments are segmented into a region including the alveoli that perform gas exchange and a region including the bronchi involving no gas exchange. In the case of surgically removing lung cancer, all of cancerous lobes are removed typically. It is however important to evaluate the degree of function of the remaining lobes before the surgical removal. In other word, it is preferable to evaluate the functional image IMG22 in units of lobes as structural and functional units. In some situations, pulmonary segments of a lobe may be surgically removed instead of lobes to preserve the pulmonary functions. In this case it is preferable to evaluate the functional image IMG22 in units of pulmonary segments as structural and functional units. It may also be preferable to evaluate the functional image IMG22 in units of lobuli or acini as structural and functional units in addition to lobes or pulmonary segments. In view of this, the processing circuitry 44 determines lobes, pulmonary segments, lobuli, or acini as structural and functional units when the function of interest appearing on the functional image IMG22 is at least one of the pulmonary gas exchange functions, i.e., ventilation, blood flow, diffusion, and respiratory movement. The structural and functional units may be set, for example, in accordance with the resolution of functional imaging by which the functional images are obtained. In high-resolution functional imaging, the alveoli may be determined as structural and functional units. Thus, the structural and functional units may differ depending on a treatment plan or details of a treatment.

The processing circuitry 44 extracts the organ to be diagnosed from each of the morphological image MG21 and the functional image IMG22 (S107).

Specifically, the processing circuitry 44 extracts the organ to be diagnosed from the morphological image IMG21. Any of various known region extraction methods is applicable to this extraction, when appropriate. The processing circuitry 44 extracts the organ to be diagnosed from the functional image IMG22 by aligning the functional image IMG22 with the morphological image IMG21 using the deformation field B obtained at S104 and copying the extracted organ from the morphological image IMG21 onto the functional image IMG22.

The processing circuitry 44 segments the organ to be diagnosed in structural and functional units on each of the morphological image IMG21 and the functional image IMG22 (S108).

Specifically, the processing circuitry 44 segments the organ to be diagnosed appearing on the morphological image IMG21 in the structural and functional units as determined, to generate a segmental morphological image IMG215. As an example, the processing circuitry 44 segments an extracted pulmonary region in units of lobes determined as structural and functional units. Any of various known methods is suitably adoptable for the segmentation of the extracted organ in units of lobes.

The processing circuitry 44 then aligns the functional image IMG22 with the morphological image IMG21 using the deformation field B obtained at S104 and copies the structural and functional unit region of the morphological image IMG21 onto the functional image IMG22. Thereby, the processing circuitry 44 extracts the structural and functional unit region from the functional image IMG22 to generate a segmental functional image IMG225.

The processing circuitry 44 extracts the organ to be diagnosed from each of the reference morphological image IMG11 and the reference functional image IMG12, similar to the process of S107 (S109). Specifically, the processing circuitry 44 extracts the organ to be diagnosed from the reference morphological image IMG11, and extracts the organ to be diagnosed from the reference functional image IMG12 using the deformation field A obtained at S102.

The processing circuitry 44 segments the organ to be diagnosed on each of the reference morphological image IMG11 and the reference functional image IMG12 in structural and functional units, similar to the process of S108 (S110). Specifically, the processing circuitry 44 segments the organ to be diagnosed on the reference morphological image IMG11 in the determined structural and functional units to generate a segmental reference morphological image IMG115, and segments the reference functional image IMG12 in the structural and functional units using the deformation field A to generate a segmental reference functional image IMG125.

After generating the respective segmental images, the processing circuitry 44 aligns the images of the test subject P2 and the healthy subject P1 with each other per structural and functional unit for registration (S111 to S112).

The processing circuitry 44 first aligns the reference morphological image IMG11 and the morphological image IMG21 with each other per structural and functional unit (S111).

Specifically, the processing circuitry 44 individually aligns the structural and functional units on the morphological image IMG21 of the test subject P2 with the corresponding structural and functional units on the reference morphological image IMG11 of the healthy subject P1 for registration. In the example of FIG. 2, the processing circuitry 44 aligns the segmental morphological image IMG215 of the test subject P2 with the segmental reference morphological image IMG115 of the healthy subject P1 for registration. Any of various known methods is applicable to the alignment. By this alignment, deformation fields (C1, C2, C3 . . . ) for the respective structural and functional units where the structural and functional units on the morphological image IMG21 of the test subject P2 become aligned with the corresponding structural and functional units on the reference morphological image IMG11 of the healthy subject P1 are generated. In the example of FIG. 2, a deformation field C is generated for aligning the segmental morphological image IMG215 of the test subject P2 with the segmental reference morphological image IMG115 of the healthy subject P1.

The processing circuitry 44 then aligns the reference functional image IMG12 and the functional image IMG22 with each other per structural and functional unit (S112).

Specifically, for registration the processing circuitry 44 individually aligns the structural and functional units on the functional image IMG22 of the test subject P2 with the corresponding structural and functional units on the reference functional image IMG12 of the healthy subject P1, using the deformation fields A, B, and C. In the example of FIG. 2, the processing circuitry 44 aligns the segmental functional image IMG225 of the test subject P2 with the segmental reference functional image IMG125 of the healthy subject P1, using the deformation fields A, B, and C. By this alignment per structural and functional unit, a segmental functional image IMG2251 of the test subject P2 aligned with the segmental reference functional image IMG125 of the healthy subject P1 can be generated.

The processing circuitry 44 displays, on the display 42, the reference functional image IMG12 and the functional image IMG22 mutually aligned per structural and functional unit (S113).

Specifically, the processing circuitry 44 generates, for display on the display 42, a display image IMG3 depicting the segmental reference functional image IMG125 and the segmental functional image IMG2251 mutually aligned per structural and functional unit in a comparable manner.

As an example, the display image IMG3 depicts the segmental reference functional image IMG125 and the segmental functional image IMG2251 in juxtaposition.

As another example, the display image IMG3 represents differences between the segmental reference functional image IMG125 and the segmental functional image IMG2251.

As still another example, the display image IMG3 alternatively depicts the segmental reference functional image IMG125 and the segmental functional image IMG2251.

As such, displaying the segmental reference functional image IMG125 and the segmental functional image IMG2251 in a comparable manner makes it possible for the user to easily determine the functional state of each structural and functional unit of the test subject P2 as normal or anomalous and as hypofunction or hyperfunction if found anomalous.

The present embodiment has described, but is not limited to, an example of image processing to the images of the healthy subject P1 and the images of the test subject P2 in series.

For example, the reference functional image and the reference morphological image of the healthy subject P1 may be aligned with each other (S102), prior to the image processing to the images of the test subject P2. In this case, the generated deformation field A may be obtained from, for example, the memory 41 together with the reference functional image and the reference morphological image of the healthy subject P1.

For another example, the image processing to the images of the healthy subject P1 (S101 to S102, S109 to S110) may precede the image processing to the images of the test subject P2 (S103 to S104, S107 to S108). In this case, the deformation field A may be obtained from, for example, the memory 41 together with the reference functional image and the reference morphological image of the healthy subject P1. Alternatively, the segmental reference functional images and the segmental reference morphological images in structural and functional units may be additionally obtained from, for example, the memory 41. The structural and functional units, that is, units of segmentation of the functional image and the morphological image may differ depending on various factors such as an organ to be diagnosed, a function of interest, an examination phase, a treatment plan or details of treatment, and a type of the functional image. As such, the deformation fields (C1, C2, C3, . . . ) for the respective structural and functional units, the segmental reference functional images, and the segmental reference morphological images can be generated in different units of segmentation.

The mutually aligned reference functional image and reference morphological image of the healthy subject P1 may be concurrently obtained by, for example, the PET-CT apparatus. In this case, the deformation field A may be unnecessary and the operation at S102 may not be performed.

Likewise, the mutually aligned functional image and morphological image of the test subject P2 may be concurrently obtained by, for example, the PET-CT apparatus. In this case, the deformation field B may be unnecessary and the operation at S104 may not be performed.

As described above, in the X-ray CT apparatus 1 incorporating the medical image processing apparatus of an embodiment, the processing circuitry 44 is configured to be able to implement the system control function 441, the segmentation function 445, and the registration function 446.

As an example, the processing circuitry 44 uses the system control function 441 to obtain a morphological image including a predetermined organ of a test subject and a functional image corresponding to the morphological image. The processing circuitry 44 obtains a reference morphological image of a healthy subject corresponding to the morphological image of the test subject as well as a reference functional image of the healthy subject corresponding to the functional image of the test subject. The processing circuitry 44 uses the segmentation function 445 to obtain segmental morphological images of the test subject and segmental reference morphological images of the healthy subject by individually segmenting the morphological image of the test subject and the reference morphological image of the healthy subject according to a function of interest appearing on the functional image of the test subject. The processing circuitry 44 further obtains segmental functional images by segmenting the functional image with reference to the segmental morphological images of the test subject, and obtains segmental reference functional images by segmenting the reference functional image with reference to the segmental reference morphological images of the healthy subject. The processing circuitry 44 uses the registration function 446 to align the segmental morphological images of the test subject and the segmental reference morphological images of the healthy subject with each other to align the segmental functional images of the test subject and the segmental reference functional images of the healthy subject with each other according to a result of the morphological alignment.

Owing to such features, it is possible to align the functional image of the test subject as a subject of functional diagnosis and the functional image of the healthy subject to be compared with the test subject in terms of a site of the organ to be diagnosed, the site that performs the function of interest. Thus, the medical image processing apparatus of the present embodiment can properly compare the functional images of the test subject and the healthy subject, contributing to improvement in diagnostic accuracy based on the functional images.

As an example, the lungs may be considered to have the functions in a uniformly distributed manner, however, it is known that the degree of pulmonary function differs among the upper lobe, the middle lobe, and the lower lobe, for example. Because of this, it is difficult to diagnose anomaly in the lungs of the test subject, such as local functional deterioration or increase, only from the functional images of the test subject. Further, the alignment between the functional images of the test subject and the healthy subject may be performed with reference to the outer shape of the lungs with distinctive boundaries, for example. In such a case, however, the regions exhibiting functional deterioration or increase in the lungs may not be aligned accurately. In this regard, the medical image processing of an embodiment can align the functional image of the test subject with the functional image of the healthy subject per structural and functional unit such as lobes, pulmonary segments, lobuli, and acini, which enables accurate evaluation of local functional anomaly.

The functional images as PET images are known to be lower in spatial resolution than the morphological images, for example. However, development of a method to obtain functional images with higher spatial resolution is expected in the near future. It is thus more important to accurately compare the regions performing the function of interest on the functional images with higher spatial resolution, when such images become available.

The above embodiments have described, but are not limited to, an example of using the deformation fields A, B, and C with reference to the coordinate system of the reference morphological image IMG11, as illustrated in FIG. 2. Alternatively, the deformation fields A, B, and C can be generated with reference to the coordinate system of another image. As an example, in the medical image processing of an embodiment the deformation field A may be generated as a deformation field for aligning the reference morphological image IMG11 with the reference functional image IMG12. The orientation of each deformation field can be appropriately set depending on the coordinate system of a reference image.

Moreover, the above embodiments have described, but are not limited to, an example of aligning the functional image IMG22 of the test subject with the reference functional image IMG12 of the healthy subject. The medical image processing of an embodiment may be configured to align the reference functional image IMG12 of the healthy subject with the functional image IMG22 of the test subject. In this case the functional image IMG22 of the test subject remains unchanged from when it is captured, therefore, the functional image IMG22 can be easily observed. In addition, it is possible to properly compare the functional image IMG22 of the test subject with the functional image of the healthy subject, as in the above embodiments.

The above embodiments have described, but are not limited to, an example of using a single healthy subject for comparison in order to diagnose the functional state of the test subject. Alternatively, statistic data based on multiple reference functional images of multiple healthy subjects may be adopted as reference functional data. Likewise, statistic data based on multiple reference morphological images of multiple healthy subjects may be adopted as reference morphological data. As such, the reference functional data and the reference morphological data based on the morphological images and the functional images of multiple healthy subjects can be used as a healthy-subject atlas.

The above embodiments have described, but are not limited to, an example of comparing between the functional images of the test subject and the healthy subject. Alternatively, it is also possible to compare the functional images of the same test subject captured at different points in time in the examination phase. This enables the user to properly observe changes in the functional state of the test subject.

The above embodiments have described, but are not limited to, an example of performing a registration process to the functional images of the lungs being the organ to be diagnosed, using pulmonary segments, lobes, lobuli, or acini as structural and functional units. The structural and functional units are not geometrically segmented regions of the organ to be diagnosed but regions set based on the anatomical structures of the organ. That is, the structural and functional units differ depending on the organ to be diagnosed.

Taking the kidney as an example, the renal parenchyma has the renal cortex extending along the outer surface and the renal medulla internally extending. The renal cortex functions to filter urine while the renal medulla functions to concentrate urine. Assume that among the renal functions of the test subject, the filtering function is to be evaluated using a means to image the filtering function, for example. In this case the means to image the filtering function will compare the functional image depicting the filtering function of the test subject and the functional image depicting that of the healthy subject. However, the means to image the filtering function may be able to identify renal regions on the functional images of the test subject and the healthy subject but may not be able to align the renal cortexes being structural and functional units thereon. Thus, the means to image the filtering function cannot spatially compare the functional images of the test subject and the healthy subject with respect to the filtering function unless it can align the renal cortexes being structural and functional units. In this regard, in a functional diagnosis of the renal filtering function of the test subject, the medical image processing of an embodiment can extract the renal cortex regions being structural and functional units from the functional images of the test subject and the healthy subject and align them, to be able to compare the functional states of the filtering functions of the test subject and the healthy subject. Likewise, in a functional diagnosis of the urine concentrating function of the test subject, the medical image processing of an embodiment can segment and align the functional images of the test subject and the healthy subject in units of renal medulla being structural and functional units, to be able to compare the functional states of the concentrating functions of the test subject and the healthy subject. The medical image processing of the present embodiment is applicable to functional diagnosis of the other renal functions including blood pressure regulation. For example, the medical image processing of the present embodiment may segment functional images to be compared in structural and functional units suitable for functional diagnosis of the blood pressure regulation to align the segmented functional images with each other.

In addition, proper granularity of the structural and functional units may differ depending on the function of interest to be diagnosed, a type of the functional image, an examination phase, or else, even if the same organ is a subject of diagnosis. In view of this, the medical image processing according to the above embodiments allows change of the units of segmentation according to at least one of the organ to be diagnosed, the function of interest to be diagnosed, a type of the functional image, and an examination phase.

In pulmonary sequestration, for example, dysplastic lung tissues (sequestrated lung) exist inside or outside the normal lungs, and the bronchi inside the sequestrated lung are in no communication with the normal bronchi and receive an anomalous vascular supply branching from the aorta, in place of the pulmonary arterial supply. In this regard, in the medical image processing of an embodiment the sequestrated lung is considered as a non-structural and functional unit at the time of segmenting the functional images based on an anatomical structure as a structural and functional unit, to exclude the sequestrated lung from the subjects of evaluation based on the functional images. As such, the medical image processing of an embodiment allows setting of regions to be segmented and regions to be non-segmented depending on the function of interest to be diagnosed, in addition to the units of segmentation.

The medical image processing according to the above embodiments is applicable to both of the organs that function relatively uniformly such as lungs, liver, and thyroid gland, and the organs that function in a distributed manner such as pancreas, kidneys, brain, eyeballs, and ears.

Taking the liver as an example, the hepatic functions may be evaluated by contrast-enhanced MRI using gadoxetate sodium Gd-EOB-DTPA. Gd-EOB-DTPA is specifically ingested into hepatic cells and excreted in bile, which allows imaging of pharmacokinetics for evaluation of the hepatic functions. The liver includes the left lobe and the right lobe each of which includes segments and subsegments. As an example, the hepatic lobules can be structural and functional units of the liver. Thus, to diagnose the hepatic functions, the medical image processing of an embodiment can segment and align the functional images of the test subject and the healthy subject, using the hepatic lobules as structural and functional units, to be able to compare the functional states of the hepatic functions between the test subject and the healthy subject.

The above embodiments have described, but are not limited to, an example of using CT images and PET images as morphological images and functional images, respectively. Various kinds of functional images are applicable when appropriate, in addition to the PET images. The PET images are obtained by externally measuring and imaging accumulation of an internally administered radioactive drug in a particular region such as tumor, for example, by visualizing glucose metabolism function using 18F-FDG. As an example, to image the pulmonary ventilation function, the functional images can be suitably obtained by lung ventilation scintigraphy, Xenon-CT, hyperpolarization MRI (HP-MRI), or $O_2$ MRI. As another example, to image the pulmonary blood flow function, the functional images can be suitably obtained by lung ventilation scintigraphy, dynamic contrast-enhanced CT, or dynamic contrast-enhanced MRI. As another example, to image the pulmonary diffusion function, the functional images can be suitably obtained by 129Xe MRI or $O_2$ MRI. As still another example, to image the pulmonary respiratory movement function, the functional images can be suitably obtained by four-dimensional CT or four-dimensional MRI with ultra-short eco time (UTE). Furthermore, the functional images can be suitably obtained by, for example, functional MRI (fMRI) that visualizes hemodynamics of the brain activity, diffusion-weighted MRI (DWI) that visualizes the degree of water diffusion in a cerebral infarct, fluorescence imaging with fluorescent labelling, magnetic nano-particle imaging, or pH imaging depending on the function of interest or the organ to be diagnosed.

The above embodiments have described, but are not limited to, the organ to be diagnosed as an example of anatomical structure. For example, the digestive tract extending from the oral cavity to the anus through esophagus, stomach, small intestine, and large intestine is an exemplary anatomical structure that performs digestive functions. Examples of the functions of the digestive tract include digestion and absorption by secretion of digestive juice and immunity. For another example, a locomotive apparatus is an exemplary anatomical structure. The locomotive apparatus is an anatomical structure including bones, joints, muscles, tendons, nerves, and ligaments in coordination with one another to control physical exertion. The locomotive apparatus is exemplified by the legs and the arms. The tendons perform spring-like functions that connect muscles and bones and have an important locomotor function. The tendons can be rendered as MRI T2 star (T2*) weighted images, for example. The T2* weighted images can be regarded as functional images. Segmental morphological images can be created from morphological images with reference to structures surrounding the tendons for registration, to compare the T2* weighted images of the tendons between the healthy subject and a patient, for example. As such, the digestive tract and the locomotive apparatuses (legs and arms) are exemplary anatomical structures to be diagnosed.

The term "processor" used herein signifies, for example, circuitry such as a CPU, a graphical processing unit (GPU), an application specific integrated circuit (ASIC), and a programmable logic device (PLD). The PLD includes a simple programmable logic device (SPLD), a complex programmable logic device (CPLD), and a field programmable gate array (FPGA). Such a processor reads and executes programs from the memory circuitry to implement the functions. The memory circuitry storing the programs is a non-transitory computer-readable storage medium. In place of being stored in the memory circuitry, the programs may be directly embedded in the circuitry of the processor. In such a case the processor reads and executes programs from its own circuitry to implement the functions. Further, in place of executing the programs, the functions corresponding to the programs may be implemented by a combination of logic circuits. According to the above embodiments, the processors may not be individually configured as a single circuit. A single processor may be configured of a combination of independent circuits to implement the functions. The elements illustrated in FIG. 1 may be integrated into a single processor to implement the functions.

According to at least one of the above embodiments, it is possible to improve the diagnostic accuracy based on the functional images.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to
obtain a morphological image including at least a predetermined anatomical structure of a test subject and a functional image relating to at least one function of the predetermined anatomical structure included in the morphological image;
obtain reference morphological data corresponding to the morphological image and reference functional data corresponding to the functional image;
generate a first deformation field by performing a first registration process to align the reference morphological data and the reference functional data with each other, the first deformation field indicating a coordinate system where the reference morphological data becomes aligned with the reference functional data;
generate a second deformation field by performing a second registration process to align the morphological image and the functional image with each other, the second deformation field indicating a coordinate system where the morphological image becomes aligned with the functional image;
obtain segmental morphological images and segmental reference morphological data by individually segmenting the morphological image and the reference morphological data according to a function of interest appearing on the functional image;
extract first segmental functional images from the functional image using the second deformation field, the first segmental functional images being structural and functional unit regions on the morphological image, and extract segmental reference functional data from the reference functional data using the first deformation field, the segmental reference functional data being structural and functional unit regions on the segmental reference morphological data;
generate a third deformation field by performing a third registration process to align the segmental morphological images and the segmental reference morphological data with each other, the third deformation field indicating a coordinate system where alignment is performed per structural and functional unit;
generate second segmental functional images from the first segmental functional images by performing a fourth registration process to align the first segmental functional images and the segmental reference functional data with each other according to the third deformation field; and
display, on a display, the segmental reference functional data and the second segmental functional images.

2. The medical image processing apparatus according to claim 1, wherein the processing circuitry is further configured to individually segment the morphological image and the reference morphological data with reference to a site of the predetermined anatomical structure, the site that performs the function appearing on the functional image.

3. The medical image processing apparatus according to claim 1, wherein the processing circuitry is further configured to individually segment the morphological image and the reference morphological data per the structural and functional unit of the predetermined anatomical structure, the structural and functional unit that performs the function appearing on the functional image.

4. The medical image processing apparatus according to claim 1, wherein the processing circuitry is further configured to individually segment the morphological image and the reference morphological data according to a type of the functional image.

5. The medical image processing apparatus according to claim 1, wherein the processing circuitry is further configured to individually segment the morphological image and the reference morphological data according to at least one of the predetermined anatomical structure and an examination phase related to the function of interest.

6. The medical image processing apparatus according to claim 1, wherein the processing circuitry is further configured to:
obtain, as the reference morphological data, a morphological image including at least the predetermined anatomical structure of a healthy subject with respect to the function of interest appearing on the functional image, and
obtain, as the reference functional data, a functional image corresponding to the morphological image.

7. The medical image processing apparatus according to claim 1, wherein the processing circuitry is further configured to:
obtain, as the reference morphological data, a plurality of morphological images including at least predetermined anatomical structures of a plurality of healthy subjects with respect to the function of interest appearing on the functional image, and
obtain, as the reference functional data, statistic data based on a plurality of functional images corresponding to the plurality of morphological images.

8. The medical image processing apparatus according to claim 1, wherein the processing circuitry is further configured to:
obtain, as the reference morphological data, a further morphological image including at least the predetermined anatomical structure of the test subject captured at a different point in time from the morphological image in an examination phase, and
obtain, as the reference functional data, a functional image corresponding to the further morphological image captured at the different point in time.

9. The medical image processing apparatus according to claim 1, wherein the processing circuitry is further configured to determine the function of interest appearing on the functional image according to at least one of:
a user input,
supplemental information attached to at least one of the morphological image and the functional image, and
examination information for obtaining at least one of the morphological image and the functional image.

10. The medical image processing apparatus according to claim 1, further comprising:
a storage that stores a table containing the function of interest appearing on the functional image or the predetermined anatomical structure and a unit of segmentation of the morphological image and the reference morphological data in association with each other.

11. The medical image processing apparatus according to claim 1, wherein the processing circuitry is further configured to individually segment the morphological image and the reference morphological data of lungs, being the predetermined anatomical structure, with reference to lobes, pulmonary regions, lobuli, or acini of the lungs, and the function of interest appearing on the functional image is at least one of ventilation, blood flow, diffusion, and respiratory movement.

12. The medical image processing apparatus according to claim 1, wherein the processing circuitry is further configured to display, on the display, the second segmental functional images and the segmental reference functional data in a comparable manner.

13. A medical image processing method, comprising:
obtaining a morphological image including at least a predetermined anatomical structure of a test subject and a functional image relating to at least one function of the predetermined anatomical structure included in the morphological image;
obtaining reference morphological data corresponding to the morphological image and reference functional data corresponding to the functional image;
generating a first deformation field by performing a first registration process to align the reference morphological data and the reference functional data with each other, the first deformation field indicating a coordinate system where the reference morphological data becomes aligned with the reference functional data;
generating a second deformation field by performing a second registration process to align the morphological image and the functional image with each other, the second deformation field indicating a coordinate system where the morphological image becomes aligned with the functional image;
obtaining segmental morphological images and segmental reference morphological data by individually segmenting the morphological image and the reference morphological data according to a function of interest appearing on the functional image;
extracting first segmental functional images from the functional image using the second deformation field, the first segmental functional images being structural and functional unit regions on the morphological image, and extracting segmental reference functional data from the reference functional data using the first deformation field, the segmental reference functional data being structural and functional unit regions on the segmental reference morphological data;
generating a third deformation field by performing a third registration process to align the segmental morphological images and the segmental reference morphological data with each other, the third deformation field indicating a coordinate system where alignment is performed per structural and functional unit;
generating second segmental functional images from the first segmental functional images by performing a fourth registration process to align the first segmental functional images and the segmental reference functional data with each other according to the third deformation field; and displaying on a display, the segmental reference functional data and the second segmental functional images.

14. A non-transitory, computer-readable medium containing instructions for a computer to execute:
obtaining a morphological image including at least a predetermined anatomical structure of a test subject and a functional image relating to at least one function of the predetermined anatomical structure included in the morphological image;
obtaining reference morphological data corresponding to the morphological image and reference functional data corresponding to the functional image;
generating a first deformation field by performing a first registration process to align the reference morphological data and the reference functional data with each other, the first deformation field indicating a coordinate system where the reference morphological data becomes aligned with the reference functional data;
generating a second deformation field by performing a second registration process to align the morphological image and the functional image with each other, the second deformation field indicating a coordinate system where the morphological image becomes aligned with the functional image;
obtaining segmental morphological images and segmental reference morphological data by individually segmenting the morphological image and the reference morphological data according to a function of interest appearing on the functional image;
extracting first segmental functional images from the functional image using the second deformation field, the first segmental functional images being structural and functional unit regions on the morphological image, and extracting segmental reference functional data from the reference functional data using the first deformation field, the segmental reference functional data being structural and functional unit regions on the segmental reference morphological data;
generating a third deformation field by performing a third registration process to align the segmental morphological images and the segmental reference morphological data with each other, the third deformation field indicating a coordinate system where alignment is performed per structural and functional unit;
generating second segmental functional images from the first segmental functional images by performing a fourth registration process to align the first segmental functional images and the segmental reference functional data with each other according to the third deformation field; and
displaying on a display, the segmental reference functional data and the second segmental functional images.

* * * * *